United States Patent
Katoh

(10) Patent No.: US 8,683,330 B2
(45) Date of Patent: Mar. 25, 2014

(54) PROCESSING PRINT DATA USING A USER INTERFACE BEFORE TRANSMITTING THE PRINT DATA TO A PRINTER

(75) Inventor: Yuhei Katoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 42 days.

(21) Appl. No.: 13/487,546

(22) Filed: Jun. 4, 2012

(65) Prior Publication Data

US 2012/0327460 A1 Dec. 27, 2012

(30) Foreign Application Priority Data

Jun. 21, 2011 (JP) ................ 2011-137323

(51) Int. Cl.
*G06F 3/12* (2006.01)
*G03G 15/00* (2006.01)

(52) U.S. Cl.
USPC ............................. 715/274; 358/1.15; 399/81

(58) Field of Classification Search
USPC .................. 358/1.15, 527; 399/81; 715/274
See application file for complete search history.

(56) References Cited

U.S. PATENT DOCUMENTS

| 8,274,719 B2 * | 9/2012 | Tomomatsu | 358/527 |
| 2004/0139402 A1 * | 7/2004 | Azami | 715/527 |
| 2005/0286100 A1 | 12/2005 | Uotani et al. | |

FOREIGN PATENT DOCUMENTS

| EP | 1098242(A2) | 5/2001 |
| JP | 2002-333968 | 11/2002 |
| JP | 2010-66876 | 3/2010 |

OTHER PUBLICATIONS

European Patent Office Communication with Search Report dated Oct. 18, 2013 in Application No. 12171004.0.

* cited by examiner

*Primary Examiner* — Eric A Rust
(74) *Attorney, Agent, or Firm* — Oblon, Spivak, McClelland, Maier & Neustadt, L.L.P.

(57) ABSTRACT

An information processing apparatus for controlling printing of a printing apparatus has a user interface, a graphics unit, and a print information storing unit to store generated print information before transmitting the generated print information to the printing apparatus. When generating the print information, the graphics unit generates job identification information for identifying the printing operation settable based on the input printout conditions and a print information generation instruction. The graphics unit correlates the generated job identification information and the generated print information. The user interface generates job identification information for the printing operation, obtains the print information correlated with the generated job identification information, and activates a print information use unit for presenting information, related to the printing operation, to the user.

19 Claims, 6 Drawing Sheets

FIG. 3
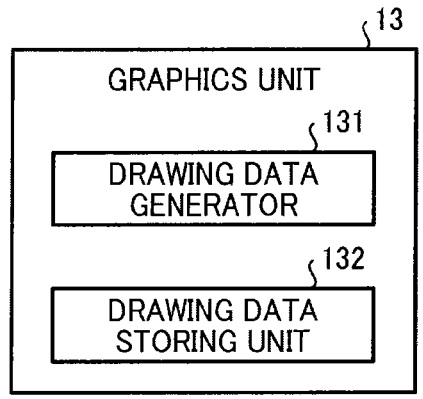
FIG. 4
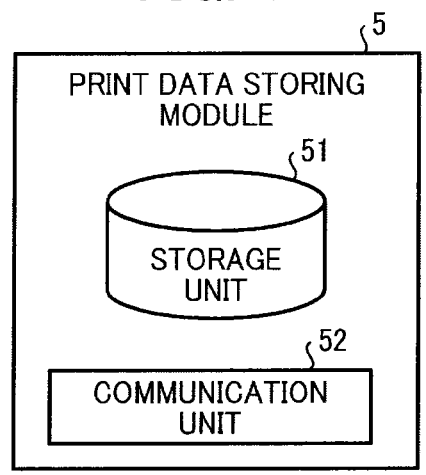
FIG. 5
| ID | FILE PATH OF DRAWING DATA | PRINTING CONDITION |
|---|---|---|
| AUr5AlnOug | xxx/xxxx/xxx/xx .xxx | DOUBLE-FACE PRINTING: xxxxxx<br>COMBINED PRINTING: XXXX |
| BZdxEcfe93 | xxx/xxxx/xxx/xx .xxx | DOUBLE-FACE PRINTING: xxxxxx<br>COMBINED PRINTING: XXXX |
| BZdxEcfe93 | xxx/xxxx/xxx/xx .xxx | DOUBLE-FACE PRINTING: xxxxxx<br>COMBINED PRINTING: XXXX |
| | . . . | |

PROCESSING PRINT DATA USING A USER INTERFACE BEFORE TRANSMITTING THE PRINT DATA TO A PRINTER

CROSS-REFERENCE TO RELATED APPLICATION

This application claims priority to Japanese Patent Application No. 2011-137323, filed on Jun. 21, 2011 in the Japan Patent Office, which is incorporated by reference herein in its entirety.

BACKGROUND

1. Technical Field

The present invention relates to a print control software program, information processing apparatus, and printing apparatus or system, and more particularly to control of a software module that executes processing using data prepared for transmitting to an image forming apparatus.

2. Description of the Background Art

With the advancement of information digitization, image processing apparatuses such as printers or facsimile machines for outputting digitized information and scanners for digitizing document information have become indispensible apparatuses. Such image processing apparatuses have image capturing, image forming, and communication capabilities that enable them to function as printers, facsimile machines, scanners, copiers, or multi-functional apparatuses combining several of these capabilities and known as multi-functional peripherals (MFP).

A printing apparatus such as a printer used for outputting digitized document is generally used with an information processing apparatus such as a personal computer (PC), in which the printer executes a printing operation based on a print job generated by the PC. Further, such PC is typically provided with a printer driver adapted to the capabilities of each printer by installing a software program to generate print jobs to be input to the printer.

Further, before transmitting the print job from the printer driver to the printer, image drawing data prepared for the print job can be processed in various ways to enhance user's convenience. For example, a print preview using the image drawing data can be displayed, wherein such print preview is closer to an actual output image than a print preview using original data. Further, billing information can be displayed for a volume-charging printing system, as disclosed in JP-2002-333968-A, and JP-2010-066876-A.

In JP-2002-333968-A and JP-2010-066876-A, a graphics unit that prepares image drawing data, included in a printer driver as one of several modules, activates other modules that use the image drawing data prepared by the graphics unit.

The graphics unit has an interface to communicate data with an operating system (OS) to prepare the image drawing data, and such interface has high priority access within the OS because the graphics unit functions to prepare data. Typically, the OS does not accept processing or operations that are not ordinarily within its scope. However, in the case of a module such as an interface having high priority access within the OS attempting to conduct processing that is not ordinarily intended to be conducted with the OS, such operation request can nevertheless be accepted, and a dialog box is displayed so that a user can confirm whether such processing is to be executed.

For example, when one module having high priority access conducts processing to activate another module, the activated another module can be assigned the same or similar high priority access. In such a situation, the user is requested to confirm whether such high priority access is to be allowed for the activated other module.

In the above-described case, the process of generating image drawing data with the graphics unit is within the scope of normal processing for the OS. However, the activation of another module that uses the image drawing data generated by the graphics unit is not within the scope of normal processing for the OS, because such activation of another module by the graphics unit is not intended to be conducted with the OS. The activation of processing not intended to be conducted with the OS can be conducted by the OS, but such activation is not a guaranteed process and any change in the OS might disrupt such activation. The above-mentioned dialog box is displayed when the activation of processing not intended to be conducted for the OS is attempting to be conducted, indicating a state of low compatibility with the OS.

However, the dialog box may inconvenience a user who is not knowledgeable about the operation of personal computers (PCs) and may have difficulty responding to the dialog box. Further, even if the user is knowledgeable about PCs, the dialog box may still inconvenience the user because in any case the user still needs to respond to the dialog box.

Further, as above described, because the activated module can be assigned the high priority access of the module that has activated the activated module, doing so might create a security hole if the software program is purposely altered.

SUMMARY

In one aspect of the present invention, an information processing apparatus is devised. The information processing apparatus is connectable to a printing apparatus that executes a printing operation based on print information generated by the information processing apparatus. The information processing apparatus includes: a user interface to obtain printout conditions input by a user's operation, and to generate printing conditions data based on the printout conditions; a graphics unit to generate the print information from image data to be printed out by the printing operation based on the generated printing conditions data, the generated print information executable for the printing operation by the printing apparatus; and a print information storing unit to store the generated print information before transmitting the generated print information to the printing apparatus. When generating the print information, the graphics unit generates job identification information for identifying the printing operation that is settable based on the input printout conditions and a print information generation instruction, and the graphics unit correlates the generated job identification information and the generated print information, and stores the generated job identification information and the generated print information to the print information storing unit. When generating the print information, the user interface generates job identification information for the printing operation that is settable based on the printout conditions and a print information generation instruction, and the user interface obtains the print information, correlated with the generated job identification information from the print information storing unit. The user interface activates a print information use unit, and inputs the obtained print information to the activated print information use unit for presenting information, related to the printing operation, to the user.

In another aspect of the present invention, a method of controlling an information processing apparatus, connectable to a printing apparatus that executes a printing operation based on print information generated by the information processing apparatus, is devised. The method includes: obtaining printout conditions input by a user's operation of a user interface; generating printing conditions data based on the printout conditions; generating the print information from image data to be printed out by the printing operation based on the generated printing conditions data using a graphics unit, the generated print information executable for the printing operation by the printing apparatus; and storing the generated print information to a print information storing unit before transmitting the generated print information to the printing apparatus. When generating the print information, the graphics unit generates job identification information for identifying the printing operation that is settable based on the input printout conditions and a print information generation instruction, the graphics unit correlates the generated job identification information and the generated print information, and stores the generated job identification information and the generated print information to the print information storing unit. When generating the print information, the user interface generates job identification information for the printing operation that is settable based on the printout conditions and a print information generation instruction, the user interface obtains the print information, correlated with the generated job identification information from the print information storing unit. The user interface activates a print information use unit, and inputs the obtained print information to the activated print information use unit for presenting information, related to the printing operation, to the user.

In another aspect of the present invention, a non-transitory computer readable storage medium storing a program that, when executed by a computer, causes the computer to execute a method of controlling an information processing apparatus, is devised. The information processing apparatus includes a graphics unit, a print information storing unit, and a user interface, and connectable to a printing apparatus that executes a printing operation based on print information generated by the information processing apparatus. The method includes: obtaining printout conditions input by a user's operation of a user interface; generating printing conditions data based on the printout conditions; generating the print information from image data to be printed out by the printing operation based on the generated printing conditions data using a graphics unit, the generated print information executable for the printing operation by the printing apparatus; and storing the generated print information to a print information storing unit before transmitting the generated print information to the printing apparatus. When generating the print information, the graphics unit generates job identification information for identifying the printing operation that is settable based on the input printout conditions and a print information generation instruction, the graphics unit correlates the generated job identification information and the generated print information, and stores the generated job identification information and the generated print information to the print information storing unit. When generating the print information, the user interface generates job identification information for the printing operation that is settable based on the printout conditions and a print information generation instruction, the user interface obtains the print information, correlated with the generated job identification information from the print information storing unit. The user interface activates a print information use unit, and inputs the obtained print information to the activated print information use unit for presenting information, related to the printing operation, to the user.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 3 shows functional units of a graphics unit of a printer driver of FIG. 1;

FIG. 4 shows functional units of a print data storing unit or module of a printer driver of FIG. 1;

FIG. 5 shows example of information stored by the print data storing unit or module of FIG. 4;

Figure 1:
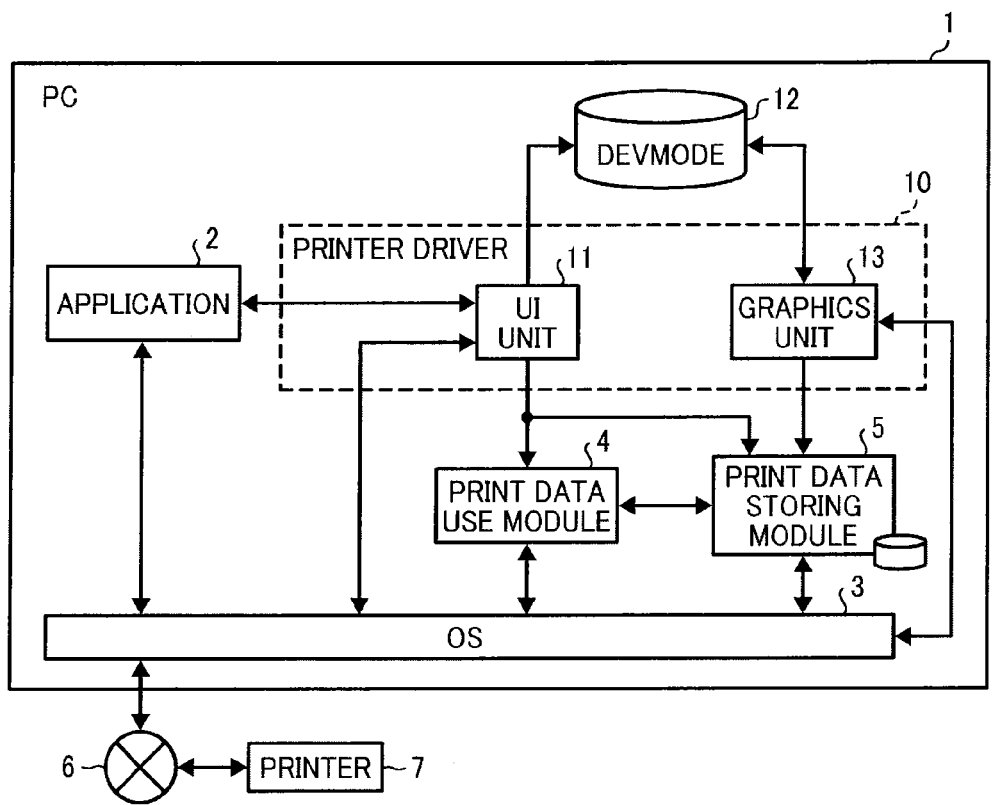
FIG. 1 is a block diagram of printing system according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, an apparatus or system according to one or more example embodiments is described hereinafter.

A printing system according to an example embodiment may include an information processing apparatus such as a personal computer (PC) installed with a printer driver, and a printing apparatus such as a printer to execute a printing operation based on a print job generated by the printer driver. The printing apparatus is not limited to the printer, but other apparatuses that can output images based on the print job generated by the printer driver installed in the PC can be used.

FIG. 1 is a block diagram of a printing system according to an example embodiment. As shown in FIG. 1, the printing system includes a PC 1 and a printer 7, which can be connected with each other, for example, via a network 6. The PC 1 may include an application 2, an operating system (OS) 3, a printer driver 10, a device mode (DEVMODE) 12, a print data storing module 5, and a print data use module 4. The printer driver 10 may include a user interface (UI) unit 11, and a graphics unit 13. In the PC 1, the installed application 2 can be activated on the OS 3, and the activated application 2 can provide functions such as document preparation, image editing, or the like. Further, the PC 1 can provide data or information to be used for printing in response to a user's operation.

The application 2 can activate the UI unit 11 of the printer driver 10 in response to a user's operation. The application 2 obtains information for printout conditions, set via a graphical user interface (GUI) of the UI unit 11 with information format such as DEVMODE structure (hereinafter, DEVMODE 12). Further, the UI unit 11 can activate the print data storing module 5 and the print data use module 4. In this disclosure, data (e.g., print data) prepared or generated by the graphics unit 13 can be used by the UI unit 11, in which the print data storing module 5 can be used to transfer data from the graphics unit 13 to the UI unit 11, and then the print data use module 4 can use the transferred data.

When a print execution instruction is input by a user's operation to the application 2 or to the UI unit 11 activated by the application 2, the application 2 activates a graphics device interface (GDI) included in the OS 3 as an image drawing engine. The GDI is an image drawing engine installed in a basic software program such as OS. The GDI can activate the graphics unit 13 of the printer driver 10 via a device driver interface (DDI) to conduct a given process.

Based on an instruction of OS, the GDI outputs image data. The graphics unit 13 of the printer driver 10 converts such image data to image drawing data such as page description language (PDL) data that can be processed by the printer 7 that can execute a printing operation. The graphics unit 13 prepares or generates the image drawing data corresponding to user's setting based on the DEVMODE 12. The PDL data can be used as print information to be used by the printer 7 when executing a printing operation.

The graphics unit 13 transfers the PDL data to the print data storing module 5. The print data storing module 5 is used as a print information storing unit to store the image drawing data prepared or generated by the graphics unit 13 and to be used by the print data use module 4.

The print data use module 4 is used as a print information use unit to present information of the image drawing data to a user using functions such as preview display, editing of image drawing data, and display of billing amount.

Figure 2:
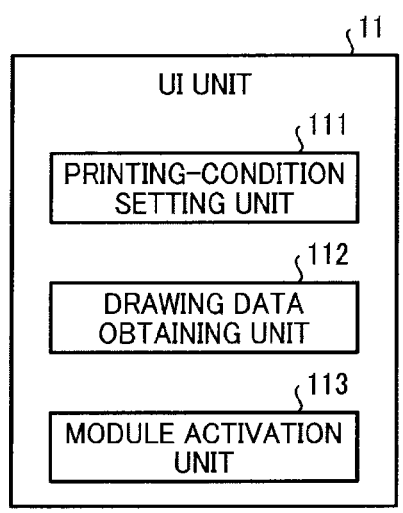
FIG. 2 shows functional units of a UI unit of a printer driver of FIG. 1.

A description is given of functions of the printer driver 10. FIG. 2 shows functional units of the UI unit 11 of the printer driver 10. As shown in FIG. 2, the UI unit 11 may include a printing-condition setting unit 111, a drawing data obtaining unit 112, and a module activation unit 113.

The printing-condition setting unit 111 is a functional unit, which may be included in a user interface (UI) unit of a typical printer driver. The printing-condition setting unit 111 provides a graphical user interface (GUI) for selecting printing conditions such as the numbers of printed sheet, layout of images, duplex printing, enlargement/reduction of images so that a user can select printing conditions through the GUI. Based on the selected printing conditions, the printing-condition setting unit 111 prepares or generates the DEVMODE 12.

The drawing data obtaining unit 112 checks whether image drawing data having specific identification (ID) information is stored in the print data storing module 5. The specific ID information is assigned for each one of print jobs, which may be referred to as job ID. When a plurality of printing operations is conducted in parallel, each of the printing operations is required to be identified with each other, in which job ID information is assigned to each one of the print jobs to identify each one of the printing operations. If the image drawing data having the specific job ID information is stored in the print data storing module 5, the drawing data obtaining unit 112 obtains the concerned image drawing data, and transfers the concerned image drawing data to the print data use module 4 so that the print data use module 4 can conduct a given processing.

The module activation unit 113 executes one or more software programs to configure and activate the print data use module 4 and the print data storing module 5. As such, the module activation unit 113 is included in the UI unit 11, and the UI unit 11 can use data prepared by the graphics unit 13 by using the module activation unit 113 that can activate the print data use module 4 and the print data storing module 5.

The print data use module 4 and the print data storing module 5 can be configured using one or more software programs such as an executable file having a file name of "#####.exe" or the like. The module activation unit 113 is set with a file path for the executable file to be used for configuring the print data use module 4 and the print data storing module 5. The module activation unit 113 activates the print data use module 4 and the print data storing module 5 by executing the executable file along the file path.

The graphics unit 13 has an interface to communicate data with the OS 3 to prepare the image drawing data, and such interface has high priority access within the OS 3 because of its function to prepare data. When such interface having the high priority access within the OS 3 is to conduct processing that is not intended to be conducted with the OS 3, a dialog box is displayed so that a user can confirm whether such processing is allowed to be executed, and the user needs to respond to the dialog box to continue the process.

In contrast, an interface of the UI unit 11 that exchanges data with the OS 3 has a low priority access compared to the interface of the graphics unit 13, and thereby the above mentioned dialog box is not displayed. In an example embodiment, the graphics unit 13 prepares or generates the image drawing data, and then the print data use module 4 uses the generated image drawing data to implement various functions. Because the print data use module 4 can be activated by the module activation unit 113 included in the UI unit 11, the above mentioned dialog box may not be displayed.

Because the graphics unit 13 prepares or generates the image drawing data, the process can be simplified if the print data use module 4 and the print data storing module 5 are activated by the graphics unit 13.

However, in an example embodiment, to avoid the use of dialog box, the module activation unit 113 and the drawing data obtaining unit 112 are disposed in the UI unit 11 so that the print data use module 4 and the print data storing module 5 can be activated by the UI unit 11, in which the process result generated by the graphics unit 13 can be used via the drawing data obtaining unit 112, and thereby the dialog box is not required when using the image data for given purposes.

FIG. 3 shows functions of the graphics unit 13 of the printer driver 10. The graphics unit 13 may include a drawing data generator 131, and a drawing data storing unit 132. The drawing data generator 131 is one function included in a typical printer driver of a graphics unit, and prepares or generates image drawing data such as print data of PDL data format based on the image data prepared or generated by the GDI of the OS 3. The drawing data storing unit 132 stores the image drawing data, prepared or generated by the drawing data generator 131, to the print data storing module 5 with identification (ID) information of print job (job ID) and printing condition designated by DEVMODE.

A description is given of functions of the print data storing module 5 with reference to FIG. 4. The print data storing module 5 may include a storage unit 51 and a communication unit 52. The storage unit 51 stores the image drawing data, prepared or generated by the graphics unit 13, with the above mentioned ID information and printing condition in response to a request of the graphics unit 13. The communication unit 52 is used to communicate information or data with the graphics unit 13 and the UI unit 11.

FIG. 5 shows examples of information storable in the storage unit 51. The storage unit 51 may store a information table that includes "file path of drawing data" indicating a storing area of concerned image drawing data in a storage medium, the above-mentioned ID information such as job ID and printing condition. Such data or information are correlated and stored as the information table as shown in FIG. 5. The drawing data obtaining unit 112 of the UI unit 11 refers to such information to obtain the image drawing data and printing condition using the ID information as a key to obtain information.

Figure 6:
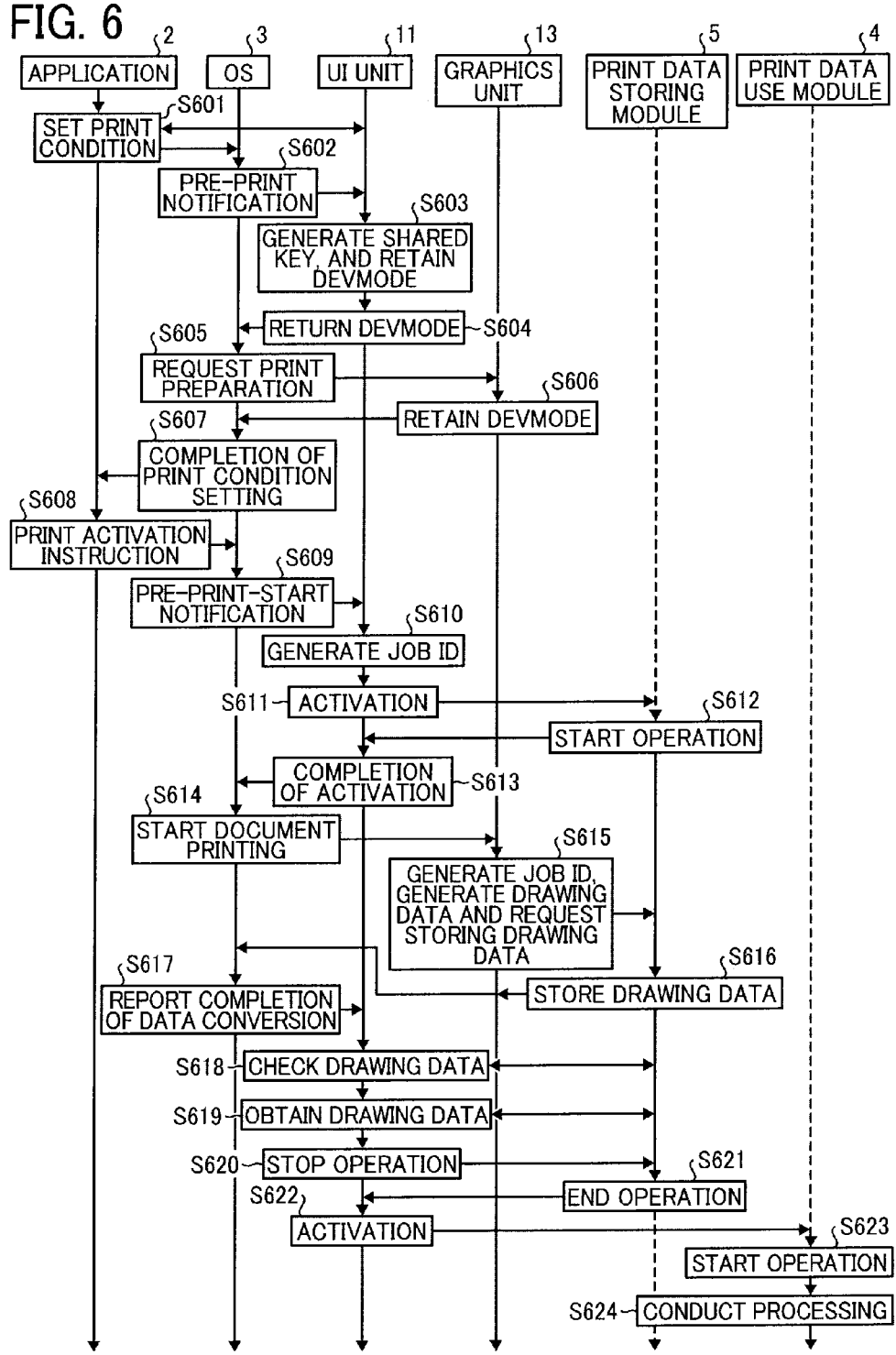
FIG. 6 shows a sequential chart of an operation of the printing system of FIG. 1.

A description is given of a process conduct-able by the system with reference to FIG. 6, which shows steps of process until the generated image drawing data is transmitted to the print data use module 4. The print data use module 4 may use the generated image drawing data for various purposes, as required, after receiving the image drawing data. As shown in FIG. 6, at first, the application 2 sets printing conditions based on an user's operation and generates the DEVMODE 12 (step S601), in which the printing-condition setting unit 111 of the UI unit 11 provides a function for setting the printing conditions. In the process shown in FIG. 6, the terms of "print" and "printing" may be used to indicate preparing data or information to be used for a printing operation by a printing apparatus such as a printer. Although the term of "print" is used in FIG. 6, it should be noted that an actual printing operation using a recording sheet is not yet conducted in the process shown in FIG. 6.

Upon setting the printing conditions and generating the DEVMODE 12 at step S601, the OS 3 reports a pre-print notification to the UI unit 11, and transmits the DEVMODE 12 to the UI unit 11 (step S602). In such a configuration, the UI unit 11 generates a shared key to identify the printing conditions and adds the shared key to the DEVMODE 12, and retains the DEVMODE 12 (step S603). The shared key may be referred to as shared identification information. The UI unit 11 and the graphics unit 13 share the shared key, which may be used in relation to the above mentioned specific ID information assigned for each one of print jobs such as job ID.

Then, the UI unit 11 returns the shared-key-added DEVMODE 12 to the OS 3 (step S604). The OS 3, which receives the shared-key-added DEVMODE 12 from the UI unit 11, requests a print preparation to the graphics unit 13 and transmits the shared-key-added DEVMODE 12 to the graphics unit 13 (step S605). Upon receiving such print preparation request, the graphics unit 13 retains the received DEVMODE 12, and reports the completion of print preparation to the OS 3 (step S606).

Upon receiving a report of completion of print preparation from the graphics unit 13, the OS 3 reports the completion of print preparation such as setting of the printing conditions to the application 2 (step S607). Upon receiving the report of the completion of setting of the printing conditions, the application 2 transfers a target print data to the OS 2 to activate a printing operation (step S608). The step S608 may be conducted when a user presses a displayed print button (e.g., an OK button of print dialog) for an application such as Word (registered trademark).

Upon obtaining the target print data from the application 2 and receiving the print activation or start instruction from the application 2, the OS 3 reports a pre-print-start notification to the UI unit 11 (step S609), wherein the OS 3 also reports a printer handle of the printer 7 as a printer identification parameter of the printer 7 that executes an printing operation. The printer handle may be referred to as handle identification information to identify the printer 7.

Upon receiving the pre-print-start notification, the UI unit 11 generates identification information referred to as the "job ID" to identify a print job based on the printer handle obtained from the OS 3 and the shared key included in the DEVMODE 12 (step S610), wherein the job ID corresponds to the ID information stored in the information table shown in FIG. 5. Then, the module activation unit 113 in the UI unit 11 activates the print data storing module 5, which can store the image drawing data generated by the graphics unit 13 (step S611).

The print data storing module 5 is activated by executing a corresponding executable file by the UI unit 11, and then the print data storing module 5 transmits a response to the UI unit 11 (step S612). Then, the UI unit 11 reports to the OS 3 that the activation or start of print data storing module 5 has completed (step S613). Upon activating the print data storing module 5, the OS 3 uses the GDI to generate image data based on the target print data obtained from the application 2, which may be referred to a document printing (step S614), and inputs the generated image data to the graphics unit 13.

Based on the printer handle, which is a printer identification parameter reported at the same time when the OS 3 reports the print activation or start instruction, the graphics unit 13 generates and retains the job ID at step S615 as similar to step S610. Upon obtaining the image data from the OS 3, the graphics unit 13 prepares or generates image drawing data of PDL data format, and transmits the PDL data to the print data storing module 5 with a request of storing data (step S615).

Upon receiving the data storing request from the graphics unit 13, the print data storing module 5 stores the image drawing data using, for example, the information table shown in FIG. 5 (step S616), and the print data storing module 5 reports the completion of data storing to the graphics unit 13. Further, the report of completion of data storing transmitted from the print data storing module 5 is further reported to the OS 3 via the graphics unit 13.

At step S615, the graphics unit 13 prepares or generates the image drawing data based on the DEVMODE 12, which is a part of printing conditions data. At step S615, among the printing conditions data included in the DEVMODE 12, only intra-page (within-page) conditions may be applied to prepare the image drawing data, and inter-pages conditions such as page-combining or the like may not be applied to prepare the image drawing data. Therefore, the image drawing data stored in the print data storing module 5 at step S616 may be the image drawing data, not edited by the inter-pages condition such as page-combining. The image drawing data prepared at step S615 may be referred to as original page image. With such a configuration, when the print data use module 4 conducts a display of preview image at a later stage, the preview can be conducted using the original page image. Once the original page image is prepared as such, the original page image can be edited by given processing later. For example, if a preview of page-combined image is requested later, such page-combined image can be prepared and displayed by conducting a page-combining process to the original page image.

Further, at step S615, the graphics unit 13 inputs the image drawing data and the printing conditions data to the print data storing module 5. With such a configuration, as shown in FIG. 5, the print data storing module 5 can store information matching the image drawing data and the corresponding printing conditions.

As above described, the graphics unit 13 prepares or generates the image drawing data based on the DEVMODE 12. Therefore, the printing conditions data input to the print data storing module 5 by the graphics unit 13 may be the DEVMODE 12 itself. Further, the printing conditions data input to the print data storing module 5 by the graphics unit 13 may be information that is prepared by the graphics unit 13 during the generation of the image drawing data using the DEVMODE 12.

After the document printing such as preparation of output data or image drawing data is started at step S614, the GDI of the OS 3 completes the conversion of the target print data at a given time later. Upon completing the conversion of the target print data, the OS 3 reports the end of document printing to the UI unit 11 (step S617). Upon receiving the report of end of document printing, the UI unit 11 checks whether the image drawing data is stored in the print data storing module 5 based on the job ID prepared at step S610 (step S618).

Upon confirming the presence of the concerned image drawing data at step S618, the UI unit 11 acquires the concerned image drawing data from the print data storing module 5 (step S619), and stops the operation of the print data storing module 5 upon completing acquisition of the concerned image drawing data (step S620). With such a configuration, the print data storing module 5 can terminate its operation (step S621), by which a memory used for executing the executable file can be released, or freed at step S621.

After terminating the operation of the print data storing module 5, the UI unit 11 activates the print data use module 4 by using the module activation unit 113 (step S622). The print data use module 4 starts its operation when the UI unit 11 executes a corresponding executable file (step S623). Then, the print data use module 4 can conduct various processing using the image drawing data (step S624). When the print data use module 4 is to start its operation, the UI unit 11 transfers the image drawing data obtained from the print data storing module 5 to the print data use module 4.

As above described, in an example embodiment, the UI unit 11 can activate the print data use module 4 and the print data storing module 5. The image drawing data prepared or generated by the graphics unit 13 can be managed by the UI unit 11, and then transferred to the print data use module 4, in which the job ID is prepared at steps S610 and S615 using a similar process. Based on the job ID, the image drawing data can be transferred or exchanged effectively. With such a configuration, the image drawing data prepared or generated by the graphics unit 13 can be stored in the print data storing module 5 and obtained by the UI unit 11, and further transferred to the print data use module 4 easily.

Figure 7:
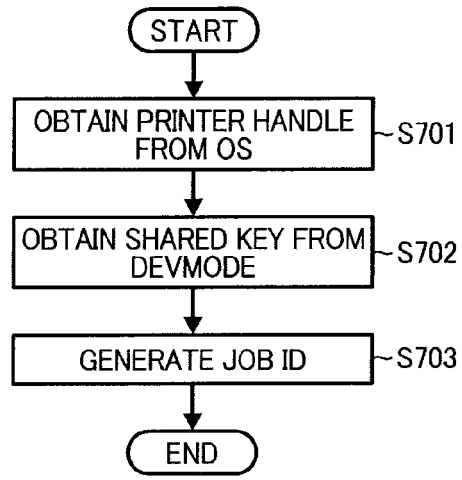
FIG. 7 is a flow chart of an operation, which is common to a UI unit and a graphics unit.

With reference to FIG. 7, a description is given of the process conducted at steps S610 and S615. At step S701, the UI unit 11 (or graphics unit 13) obtains the printer handle (printer identification information) included in the pre-print-start notification from the OS 3 (step S609). At step S702, the UI unit 11 (or graphics unit 13) reads and obtains the shared key (identification information for printing conditions data) included in the already retained DEVMODE 12.

The UI unit 11 already retains the shared key at step S603, and the graphics unit 13 already retains the shared key at step S606. A combination of the printer handle and shared key can correlate the printing conditions and print activation or start instruction. Upon obtaining the two pieces of information such as printer handle and shared key, the UI unit 11 or graphics unit 13 can prepare or generate the job ID (identification information of printing operation) based on the two pieces of information (step S703). As such, because the UI unit 11 and the graphics unit 13 can prepare or generate the job ID using the same process, the same job ID can be generated, and based on the same job ID, the image drawing data can be transferred from the graphics unit 13 to the UI unit 11. Further, even when a plurality of print instructions is output from the OS 3, each one of the print instructions can be identified and processed in parallel based on the job ID.

Figure 8:
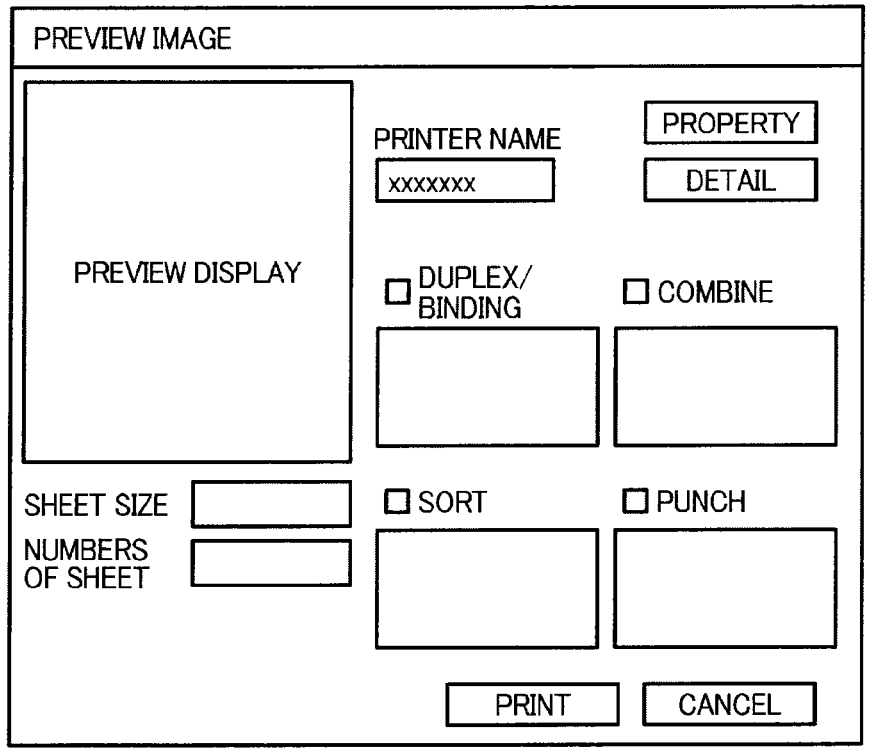
FIG. 8 shows an example of functions that a print data use unit or module can devise.

A description is given of functionality provide-able by the print data use module 4 with reference to FIG. 8, which shows a GUI used for a preview function by the print data use module 4. As shown in FIG. 8, based on the image drawing data, the print data use module 4 prepares or generates display information so that a GUI for displaying a print preview image is provided. A user can check to-be-formed images using such GUI.

Figure 9:
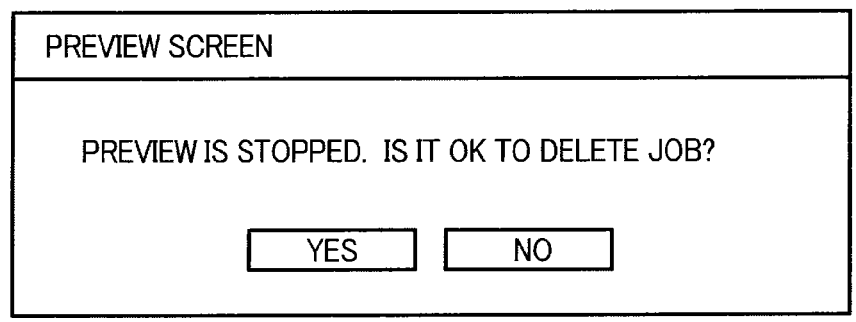
FIG. 9 shows an example of functions that a print data use unit or module can devise.

The GUI shown in FIG. 8 includes a preview screen that can display a preview image by using the print data use module 4. The print data use module 4 can display an expected-output image when the print data is actually printed using the currently-set printing conditions, and if a user wants to change printing conditions, the user can input desired parameters. For example, through the preview screen, printing conditions such as duplex printing and the numbers of print sheet can be changed. Further, the user can instruct print-execution/print-cancel through the preview screen. FIG. 9 shows a dialog box for print-execution/print-cancel, which can be used by a user to select the print-cancel on the preview screen.

As above described, the printing conditions data input to the print data storing module 5 from the graphics unit 13 may be the DEVMODE 12. If the user changes printing conditions by using the screen (FIG. 8), the print data use module 4 edits the contents of the DEVMODE 12 in line with the user's operation. Therefore, the latest printing conditions can be set before executing a printing operation by the printer 7, in which the latest PDL data can be prepared based on the edited DEVMODE 12, by which data processing can be simplified.

If the printing conditions data is prepared or generated by the graphics unit 13 and input to the print data storing module 5 from the graphics unit 13, another module may be required to prepare or generate the latest or process-completed PDL data incorporating the printing conditions changed by a user's operation. In such a case, the print data use module 4 may not edit the contents of the DEVMODE 12.

Figure 10:
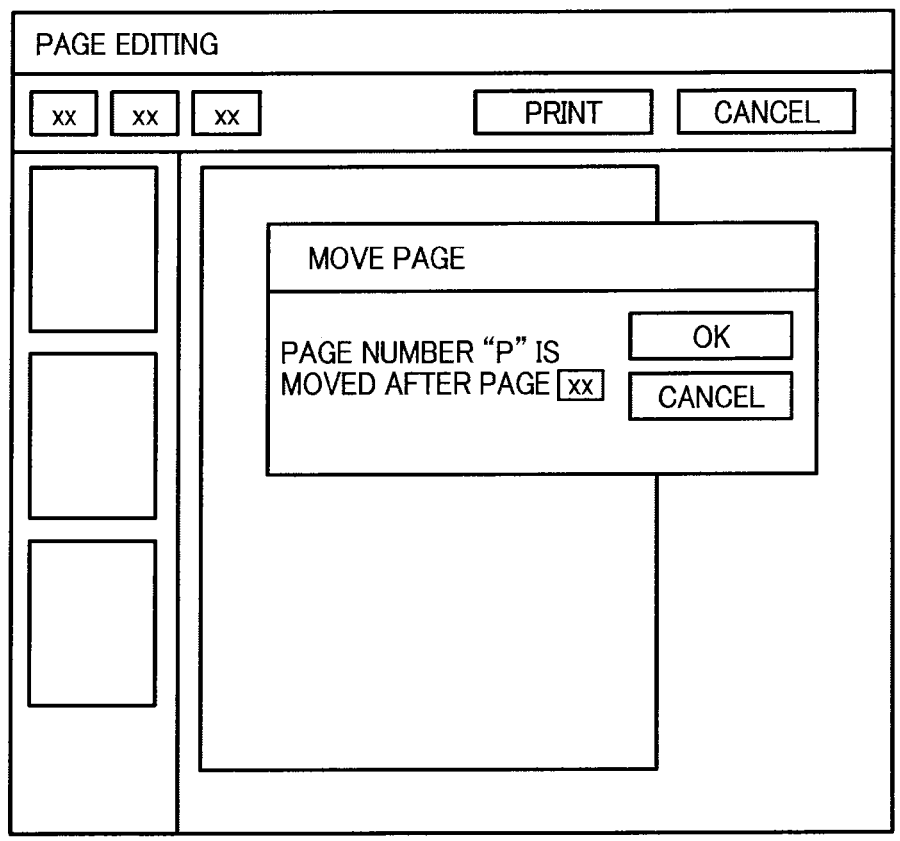
FIG. 10 shows an example of functions that a print data use unit or module can devise.

FIG. 10 shows a GUI of print page editing function by the print data use module 4. As shown in FIG. 10, the print data use module 4 can provide given functionalities such as editing a target print page, and page sequence using the image drawing data. The print data use module 4 prepares or generates, and outputs display information, with which the GUI can display the page print sequence of to-be-printed data under the currently-set printing conditions. A user can edit the printing conditions of print data using the GUI shown in FIG. 10. For example, the user can change the page sequence, can select which page is not to be printed if printing of concerned page is not preferred, and can select page-combining of pages.

Figure 11:
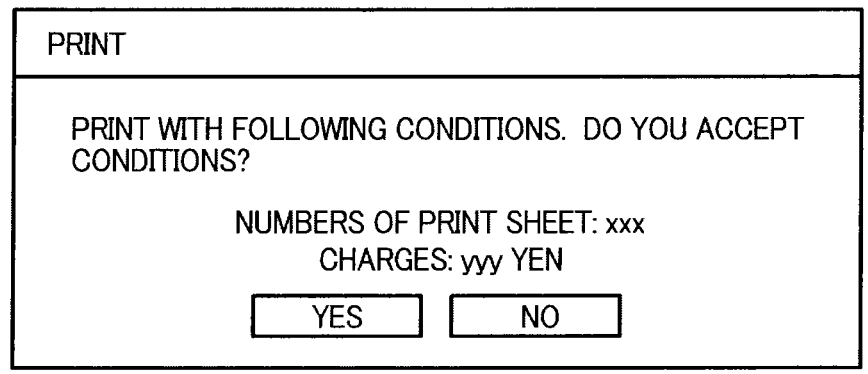
FIG. 11 shows an example of functions that a print data use unit or module can devise.

FIG. 11 shows a GUI provided by the print data use module 4 to display a billing amount for printing. As shown in FIG. 11, based on the image drawing data prepared or generated by the graphics unit 13, the print data use module 4 computes print charges when print data is to be actually printed, and displays the amount of billing to a user. In a case of FIG. 11, the user can instruct print-execution/print-cancel, and further, the display function of billing amount can be used with the above-described printing conditions and/or print page editing.

As above described, in the printing system of an example embodiment, the UI unit 11 of the printer driver 10 can activate one or more modules that use image drawing data, by which when using the image drawing data prepared or generated by the printer driver, a user's convenience can be enhanced while enhancing the security.

Further, as shown in FIG. 6, when to start a preparation of the image drawing data, the UI unit 11 activates the print data storing module 5 at step S611, and then the print data storing module 5 starts its operation. Further, when the UI unit 11 completes acquisition of the concerned image drawing data, generated by the graphics unit 13 and stored in the print data storing module 5, the UI unit 11 may terminate the operation of the print data storing module 5 at step S620.

With such processing, a memory area used for operating the print data storing module 5 and a storing area in the print data storing module 5 for storing the image drawing data can be set as small as possible, by which information processing resources such as a memory area, a storing area or the like can be efficiently used, which means excessive resources are not required.

Further, as shown in FIG. 1, the UI unit 11 and the graphics unit 13 can be included in the printer driver 10, and the print data use module 4 and the print data storing module 5 can be disposed as separate modules with respect to the printer driver 10. With employing such separate module configuration, the modules such as print data use module 4 can be easily replaced, and can enhance the functionality.

Further, the print data use module 4 and the print data storing module 5 can be included in the printer driver 10, in which the same module can be used for a server and a client, which may compose one system.

Further, the PC 1 shown in FIG. 1 can be implemented in hardware or as a combination of hardware/software. A description is given of hardware configuration of the PC 1 with reference to FIG. 12.

Figure 12:
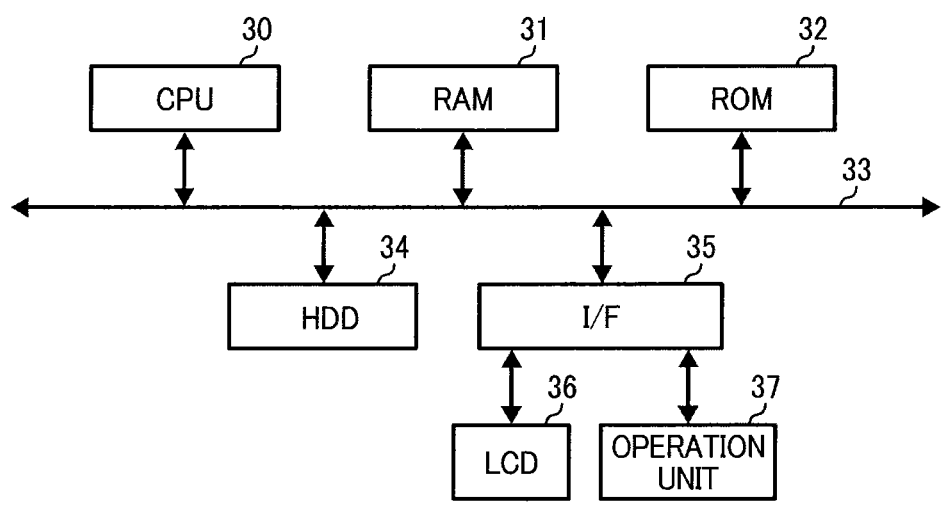
FIG. 12 is a hardware configuration of an information processing apparatus.

As shown in FIG. 12, the PC 1 may have a configuration similar to typical information processing terminals or apparatuses. Specifically, the PC 1 includes, for example, a central processing unit (CPU) 30, a random access memory (RAM) 31, a read only memory (ROM) 32, a hard disk drive (HDD) 34, and an interface (I/F) 35, wherein such units can be connected with each other via a bus 33. Further, the I/F 35 can be connected to a liquid crystal display (LCD) 36 and an operation unit 37.

The CPU 30 is a computing unit to control the PC 1 as a whole. The RAM 31 is a volatile storage medium, to which data can be read and written at high speed, and which can be used as a working memory when the CPU 30 processes data. The ROM 32 is a read-only non-volatile storage medium to store software programs such as firmware or the like.

The HDD 34 is a non-volatile storage medium, to which data can be read and written, and stores an operating system (OS), control software programs, application software programs, or the like. The I/F 35 is used to connect the bus 33 and various hardware and networks, and controls such connection. The LCD 36 is a visual-type user interface, through which a user can check the status of the PC 1. The operation unit 37 is a user interface such as a key board and a mouse, through which a user can input data or information to the PC 1.

In such hardware configuration, software programs stored in a storage medium such as the ROM 32, the HDD 34, or an optical disk can be read in the RAM 31 and executed by the CPU 30, by which software-implementing control unit can be configured. With a combination of such software-implementing control unit and hardware, the PC 1 having functional units shown in FIG. 1 can be devised.

The printer driver 10 having the UI unit 11 (FIG. 2) and the graphics unit 13 (FIG. 3) can be devised, for example, by installing one or more software programs stored in a storage medium such as an optical storage medium in the HDD 34 of the PC 1, in which the software programs may be read out from the optical storage medium.

Further, software programs for the printer driver 10 can be installed in another way. For example, one ore more software programs can be downloaded to the PC 1 via a network. In such a case, an installer program to install the printer driver 10 may be stored in a storage medium disposed for the printer 7, and the printer driver 10 can be configured in the PC 1 by downloading the installer program from the printer 7 to the PC 1. As such, software programs for the printer driver 10 can be distributed to the market by storing the software program in a storage medium of the printer 7.

As above described, image drawing data prepared or generated by a printer driver can be used while enhancing user's convenience and security of system.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a Wireless Application Protocol (WAP) or 3G-compliant phone) and so on. Since the present invention can be implemented as software, each and every aspect of the present invention thus encompasses computer software implementable on a programmable device.

The computer software can be provided to the programmable device using any storage medium for storing processor readable code such as a flexible disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the MD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, work station) may control an information processing apparatus or an image processing apparatus such as image forming apparatus using a computer-readable program, which can execute the above-described processes or steps. In the above described embodiments, at least one or more of the units of apparatus can be implemented in hardware or as a combination of hardware/software combination. In example embodiment, processing units, computing units, or controllers can be configured with using various types of processors, circuits, or the like such as a programmed processor, a circuit, an application specific integrated circuit (ASIC), used singly or in combination.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An information processing apparatus, connectable to a printing apparatus that executes a printing operation based on print information generated by the information processing apparatus, the information processing apparatus comprising:
    a user interface to obtain printout conditions input by a user's operation, and to generate printing conditions data based on the printout conditions;
    a graphics unit to generate the print information from image data to be printed out by the printing operation based on the generated printing conditions data, the generated print information executable for the printing operation by the printing apparatus; and
    a print information storing unit to store the generated print information before transmitting the generated print information to the printing apparatus,
    wherein, when generating the print information, the graphics unit generates job identification information for identifying the printing operation that is settable based on the input printout conditions and a print information generation instruction,
    wherein the graphics unit correlates the generated job identification information and the generated print information, and stores the generated job identification information and the generated print information to the print information storing unit,
    wherein, when generating the print information, the user interface generates job identification information for the printing operation that is settable based on the printout conditions and a print information generation instruction,
    wherein the user interface obtains the print information, correlated with the generated job identification information from the print information storing unit,
    wherein the user interface activates a print information use unit, and inputs the obtained print information to the activated print information use unit for presenting information, related to the printing operation, to the user.

2. The information processing apparatus of claim 1, wherein the graphics unit correlates the generated job identification information for the printing operation, the print information, and the generated printing conditions data, and stores them as correlated data to the print information storing unit.

3. The information processing apparatus of claim 2, wherein the graphics unit stores the generated printing conditions data prepared from the printout conditions to the print information storing unit.

4. The information processing apparatus of claim 1, wherein the user interface activates the print information storing unit when generating the print information, and terminates operation of the print information storing unit upon completing acquisition of the print information from the print information storing unit.

5. The information processing apparatus of claim 1, wherein, when generating the printing conditions data, the user interface generates shared identification information to identify the printing conditions data,
    wherein, in response to the print information generation instruction, the graphics unit generates the job identification information to identify the printing operation based on handle identification information to identify the printing apparatus, reported from an operating system, and the shared identification information to identify the printing conditions data generated by the user interface.

6. The information processing apparatus of claim 1, wherein the graphics unit generates and stores the print information to the print information storing unit applying intra-page conditions included in the printing conditions data but without applying inter-page conditions included in the printing conditions data.

7. The information processing apparatus of claim 1, wherein the user interface is configured as one unit, and the print information storing unit and the print data use unit are configured as another unit.

8. The information processing apparatus of claim 1, wherein the user interface, the print information storing unit, and the print data use unit are configured as one unit.

9. The information processing apparatus of claim 1, further comprising a storing unit that stores a program that causes the information processing apparatus to execute information processing.

10. A method of controlling an information processing apparatus, connectable to a printing apparatus that executes a printing operation based on print information generated by the information processing apparatus, the method comprising:

obtaining printout conditions input by a user's operation of a user interface;

generating printing conditions data based on the printout conditions;

generating the print information from image data to be printed out by the printing operation based on the generated printing conditions data using a graphics unit, the generated print information executable for the printing operation by the printing apparatus; and storing the generated print information to a print information storing unit before transmitting the generated print information to the printing apparatus, wherein, when generating the print information, the graphics unit generates job identification information for identifying the printing operation that is settable based on the input printout conditions and a print information generation instruction, wherein the graphics unit correlates the generated job identification information and the generated print information, and stores the generated job identification information and the generated print information to the print information storing unit, wherein, when generating the print information, the user interface generates job identification information for the printing operation that is settable based on the printout conditions and a print information generation instruction, wherein the user interface obtains the print information, correlated with the generated job identification information from the print information storing unit, wherein the user interface activates a print information use unit, and inputs the obtained print information to the activated print information use unit for presenting information, related to the printing operation, to the user.

11. A non-transitory computer readable storage medium storing a program that, when executed by a computer, causes the computer to execute a method of controlling an information processing apparatus, the information processing apparatus comprising a graphics unit, a print information storing unit, and a user interface, and connectable to a printing apparatus that executes a printing operation based on print information generated by the information processing apparatus, the method comprising:

obtaining printout conditions input by a user's operation of a user interface;

generating printing conditions data based on the printout conditions;

generating the print information from an image data to be printed out by the printing operation based on the generated printing conditions data using the graphics unit, the generated print information executable for the printing operation by the printing apparatus; and storing the generated print information to the print information storing unit before transmitting the generated print information to the printing apparatus, wherein, when generating the print information, the graphics unit generates job identification information for identifying the printing operation that is settable based on the input printout conditions and a print information generation instruction, wherein the graphics unit correlates the generated job identification information and the generated print information, and stores the generated job identification information and the generated print information to the print information storing unit, wherein, when generating the print information, the user interface generates job identification information for the printing operation that is settable based on the printout conditions and a print information generation instruction, wherein the user interface obtains the print information, correlated with the generated job identification information from the print information storing unit, wherein the user interface activates a print information use unit, and inputs the obtained print information to the activated print information use unit for presenting information, related to the printing operation, to the user.

12. The storage medium of claim 11, wherein the graphics unit correlates the generated job identification information for the printing operation, the print information, and the generated printing conditions data, and stores them as correlated data to the print information storing unit.

13. The storage medium of claim 12, wherein the graphics unit stores the generated printing conditions data prepared from the printout conditions to the print information storing unit.

14. The storage medium of claim 11, wherein the user interface activates the print information storing unit when generating the print information, and terminates operation of the print information storing unit upon completing acquisition of the print information from the print information storing unit.

15. The storage medium of claim 11, wherein, when generating the printing conditions data, the user interface generates shared identification information to identify the printing conditions data, wherein, in response to the print information generation instruction, the graphics unit generates the job identification information to identify the printing operation based on handle identification information to identify the printing apparatus, reported from an operating system, and the shared identification information to identify the printing conditions data generated by the user interface.

16. The storage medium of claim 11, wherein the graphics unit generates and stores the print information to the print information storing unit applying intra-page conditions included in the printing conditions data but without applying inter-page conditions included in the printing conditions data.

17. The storage medium apparatus of claim 11, wherein the user interface is configured as one unit, and the print information storing unit and the print data use unit are configured as another unit.

18. The storage medium of claim 11, wherein the user interface, the print information storing unit, and the print data use unit are configured as one unit.

19. The storage medium of claim 11, wherein the information processing apparatus further comprising a storing unit that stores a program that causes the information processing apparatus to execute information processing.

* * * * *